United States Patent [19]
Su

[11] Patent Number: 5,539,184
[45] Date of Patent: Jul. 23, 1996

[54] ELECTRIC OVEN

[76] Inventor: Yung-Sen Su, 170, Chung Lun, Chung Sha Tsun, An-Tin Hsiang, Tainan, Taiwan

[21] Appl. No.: 358,693

[22] Filed: Dec. 19, 1994

[51] Int. Cl.$^6$ .................................................. A47J 37/04
[52] U.S. Cl. ........................... 219/388; 219/218; 219/389; 99/421 V; 49/40
[58] Field of Search ...................................... 219/385, 386, 219/388, 389, 218, 405, 411; 99/419, 421 V, 426, 427; 49/40

[56] References Cited

U.S. PATENT DOCUMENTS

| | | | |
|---|---|---|---|
| 230,153 | 7/1880 | Senrick | 49/40 |
| 961,227 | 6/1910 | Hattersley | 49/40 |
| 1,719,713 | 7/1929 | Miller | 99/421 V |
| 2,049,481 | 8/1936 | Walterspiel | 99/421 V |
| 2,581,570 | 1/1952 | Amanatides | 99/421 V |
| 3,744,403 | 7/1973 | Castronudvo | 99/421 V |
| 4,545,630 | 10/1985 | Izumi et al. | 312/285 |
| 5,034,587 | 7/1991 | Takagi | 219/754 |
| 5,081,916 | 1/1992 | Kühling et al. | 99/419 |

Primary Examiner—Teresa J. Walberg
Assistant Examiner—J. Pelham
Attorney, Agent, or Firm—Alfred Lei

[57] ABSTRACT

An electric oven including a base provided on a top with a groove, a motor arranged within the base and having an output shaft upwardly extending out of the base, an annular member having a plurality of rollers at a circumference thereof and disposed on the top of the base, a plug connected with an upper end of the output shaft, a tray disposed on the annular member and fixedly connected with the plug, the tray being provided with a supporting frame thereon, an outer housing fixedly mounted on the top of the base and surrounded by the groove of the base, a cover engaged with the upper outer housing, a door rotatably connected with the groove of the base, and a plurality of heating rods fixedly mounted between the base and the cover.

1 Claim, 10 Drawing Sheets

5,539,184

ELECTRIC OVEN

BACKGROUND OF THE INVENTION

Electric ovens are well known and commercially available. However, it has been found that the prior art electric oven for roasting hens, ducks, or the like on the market has a lot of disadvantages. First of all, it is necessary to put one's hand(s) into the electric oven in order to take out the roasted food hence often causing accident to the user when touching the oven. Another major drawback is that such an electric oven cannot be dismantled to remove the grease and other drippings extracted from food during the roasting process thereby making it very difficult to clean the oven and therefore causing much inconvenience in use.

Therefore, it is an object of the present invention to provide an improved electric oven which can obviate and mitigate the above-mentioned drawbacks.

SUMMARY OF THE INVENTION

This invention relates to an improved electric oven.

It is the primary object of the present invention to provide an electric oven which can be easily dismantled and assembled.

It is another object of the present invention to provide an electric oven which is facile to operate.

It is still another object of the present invention to provide an electric oven which can be used to roast a hen or the like evenly.

It is still another object of the present invention to provide an electric oven which can be used to bake a pizza.

It is still another object of the present invention to provide an electric oven which is safe in use.

It is a further object of the present invention to provide an electric oven which is simple in construction.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
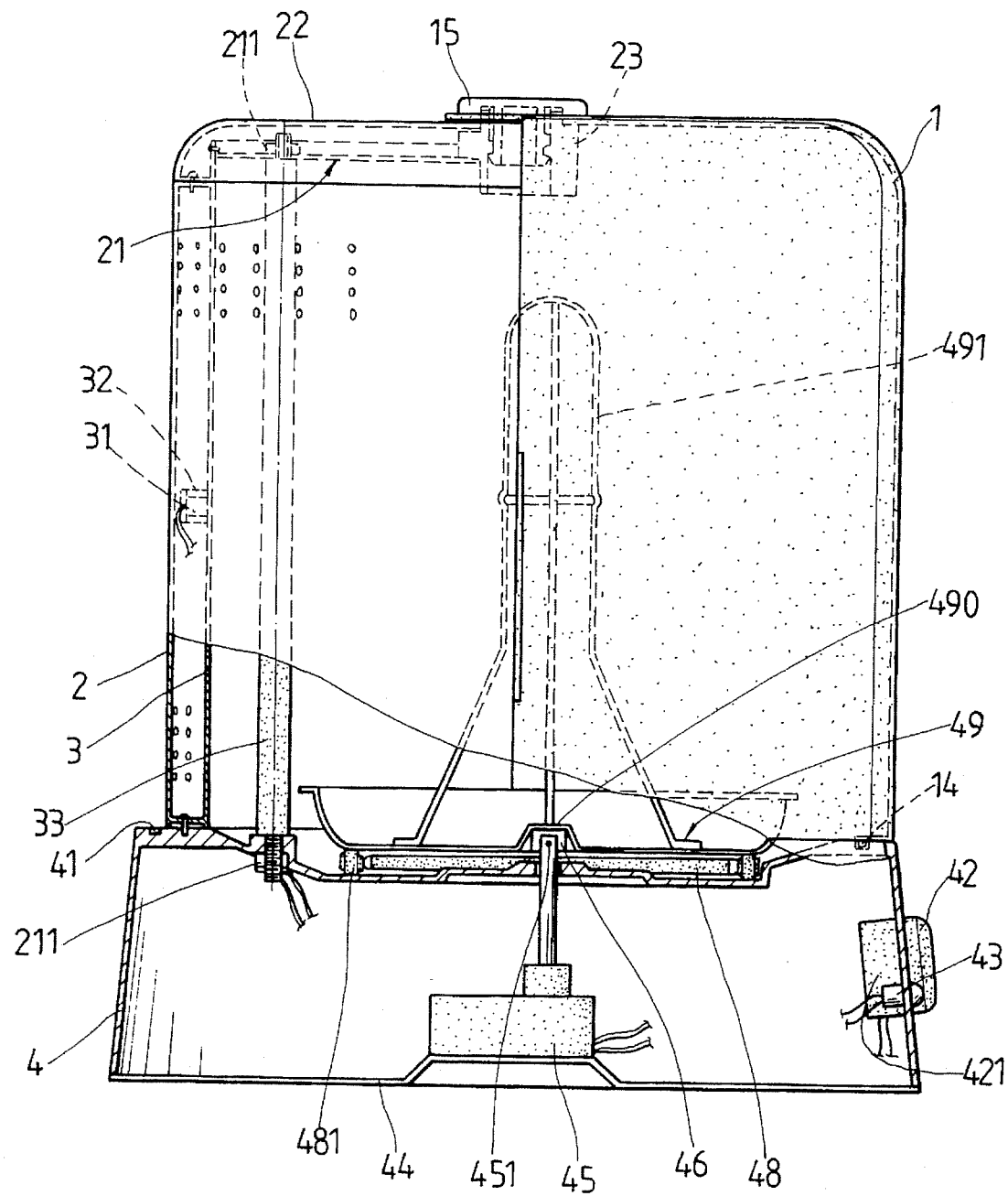
FIG. 1 is side view of the present invention.
Figure 2:
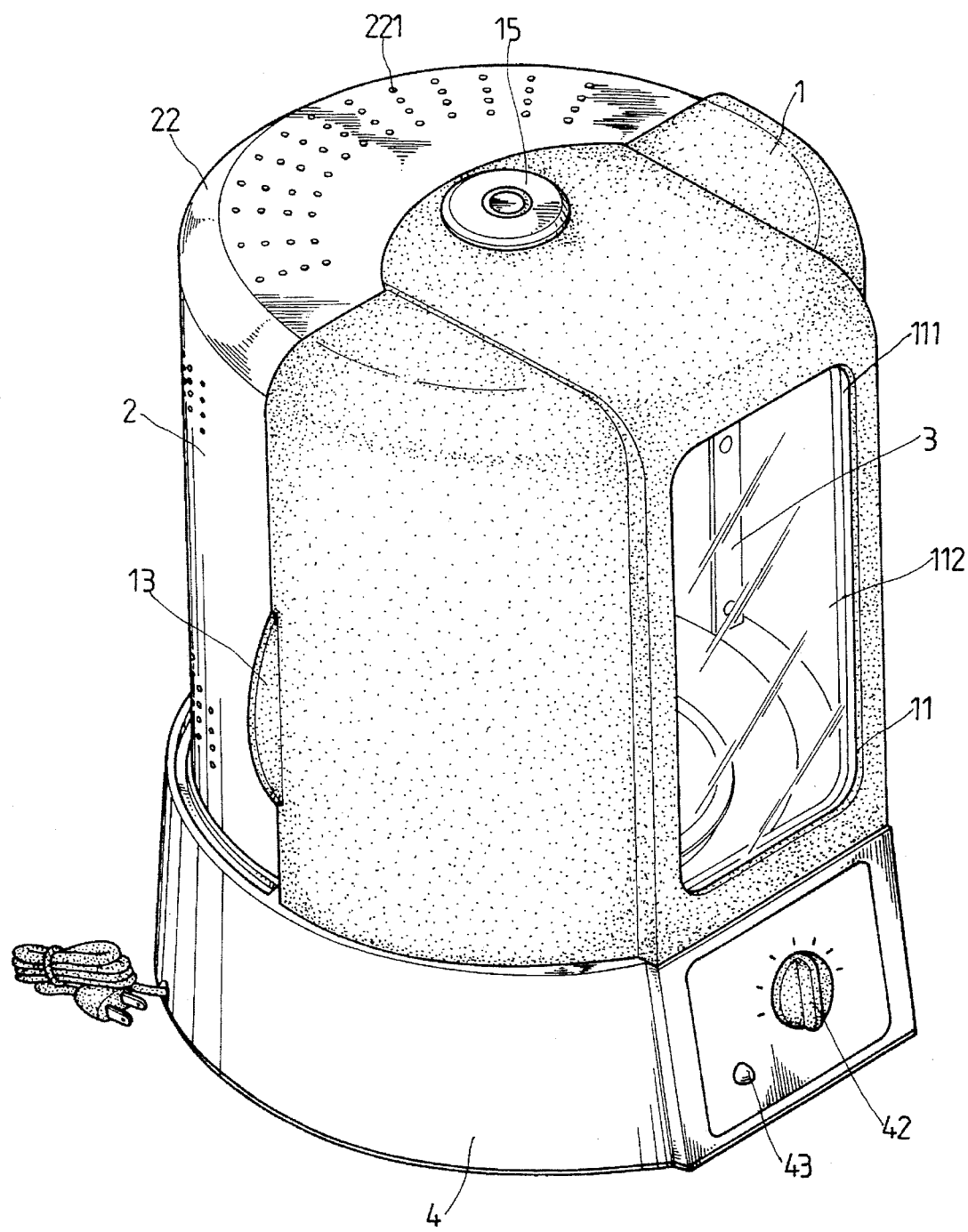
FIG. 2 is a perspective view of the present invention.
Figure 3:
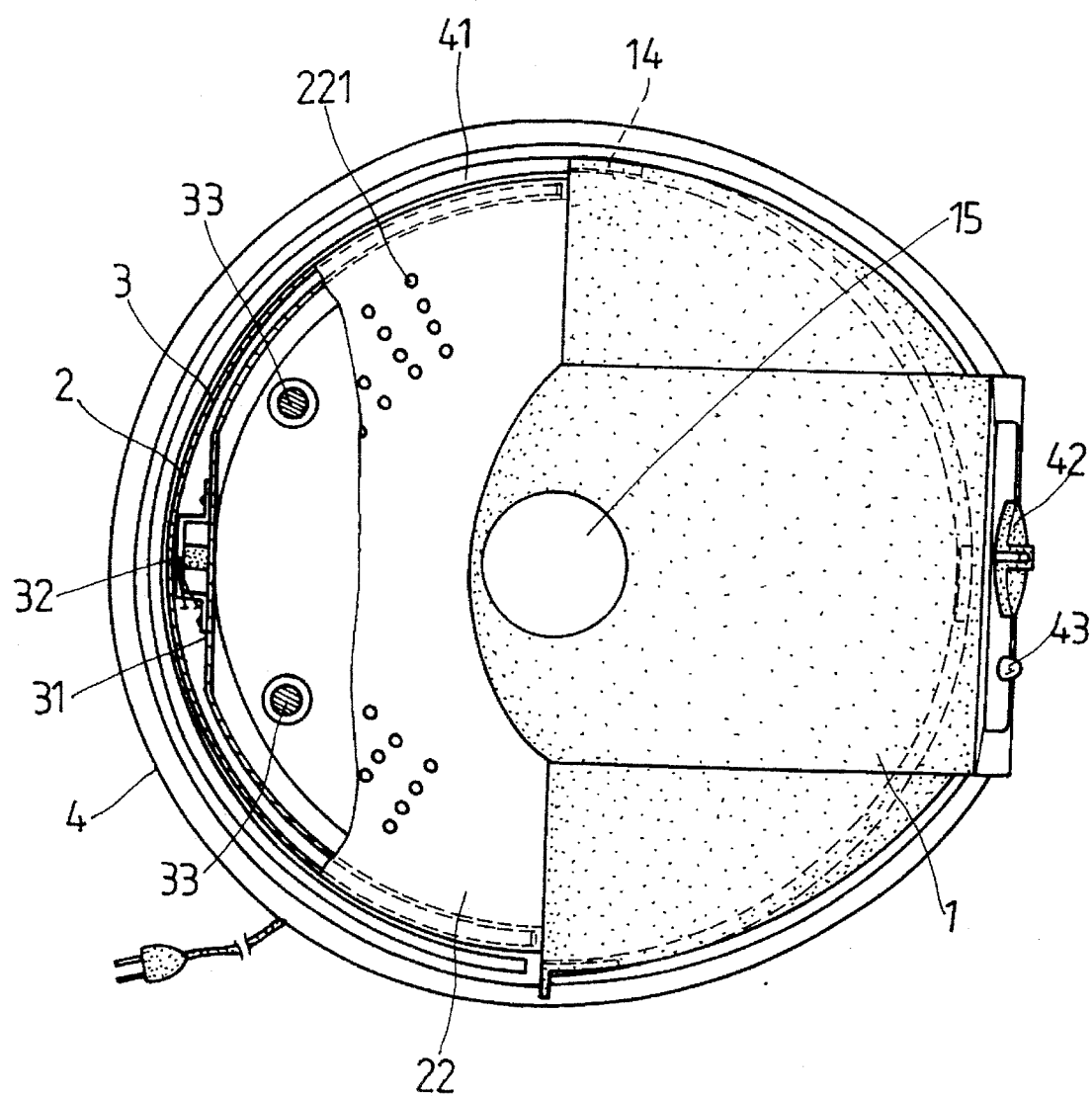
FIG. 3 is a top view of the present invention.
Figure 4:
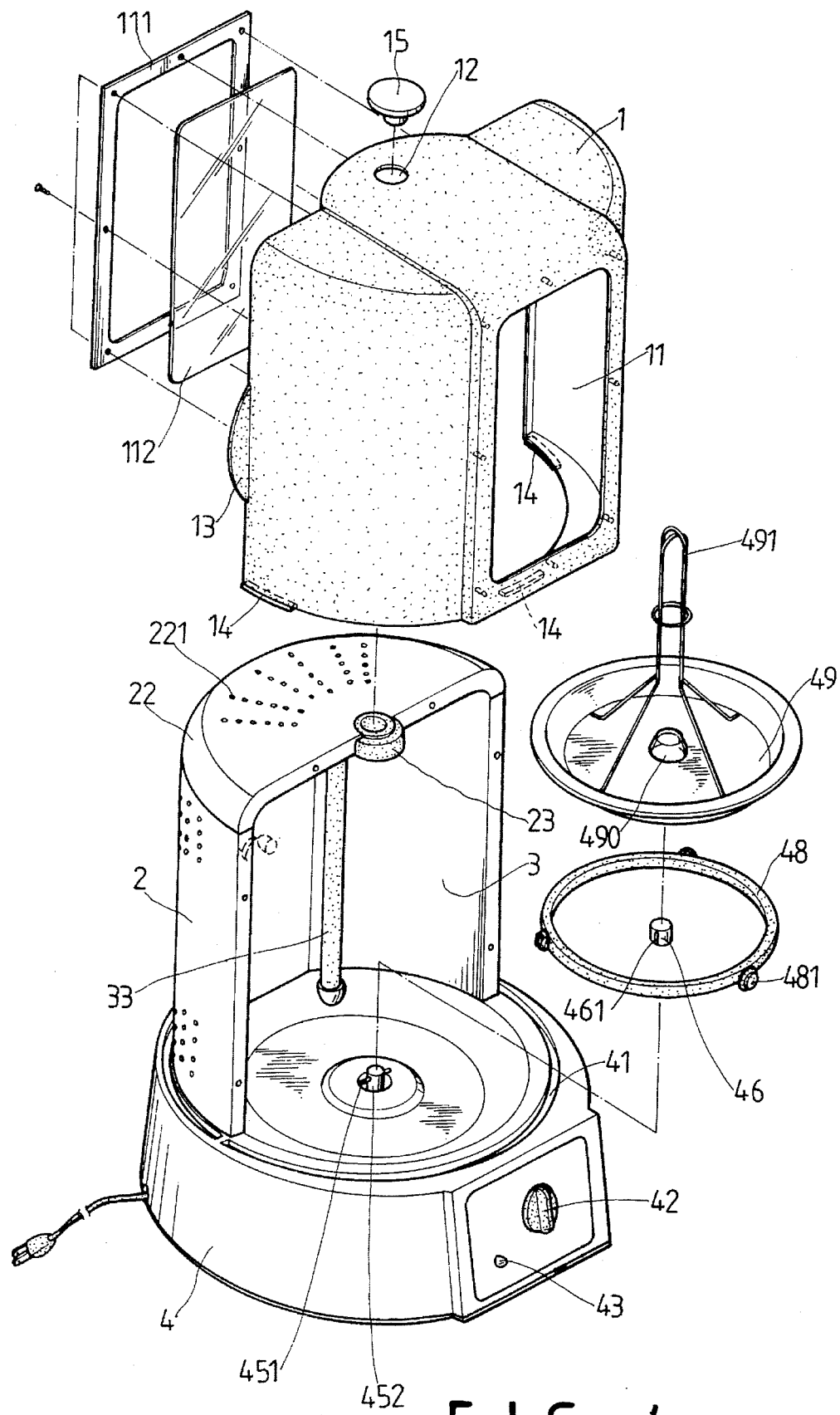
FIG. 4 is an exploded view of the present invention.
Figure 5:
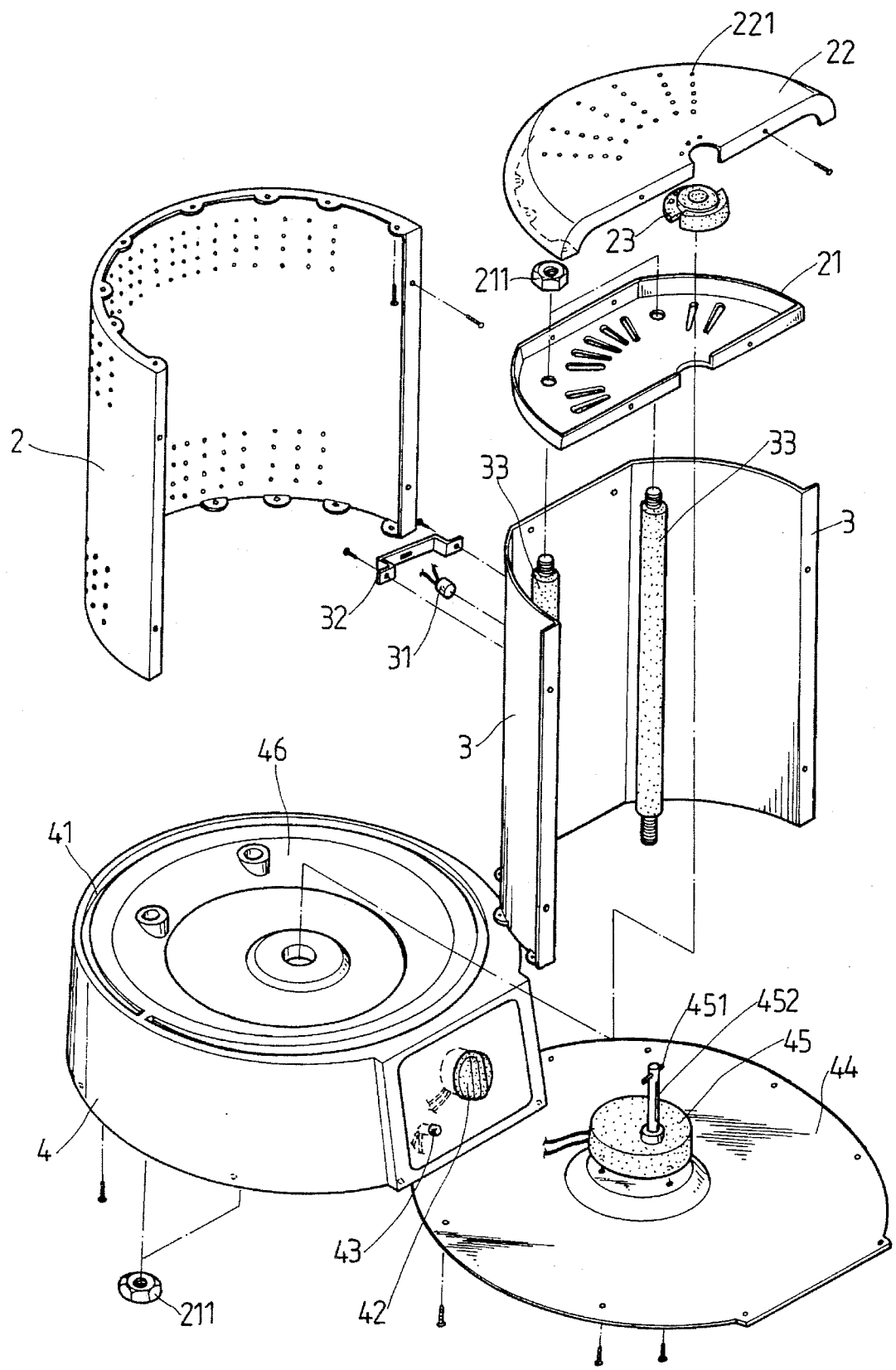
FIG. 5 is another exploded view of the present invention.
Figure 6:
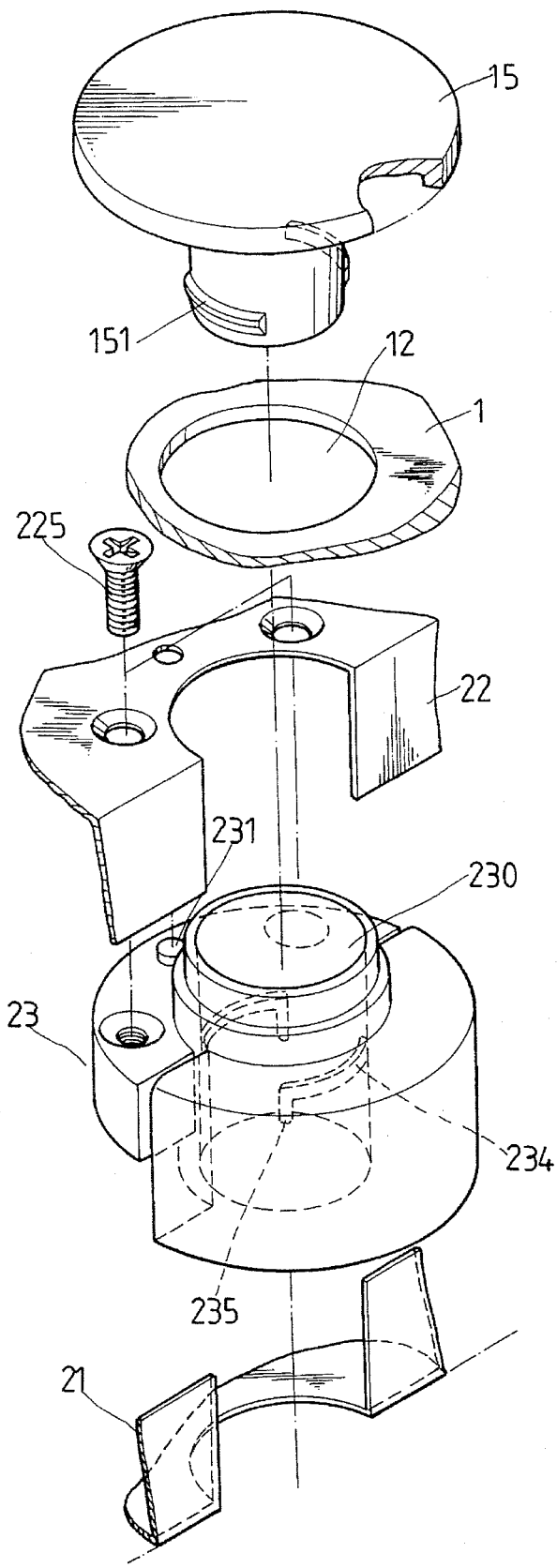
FIG. 6 shows the relationship between the cap and the axle member.
Figure 7:
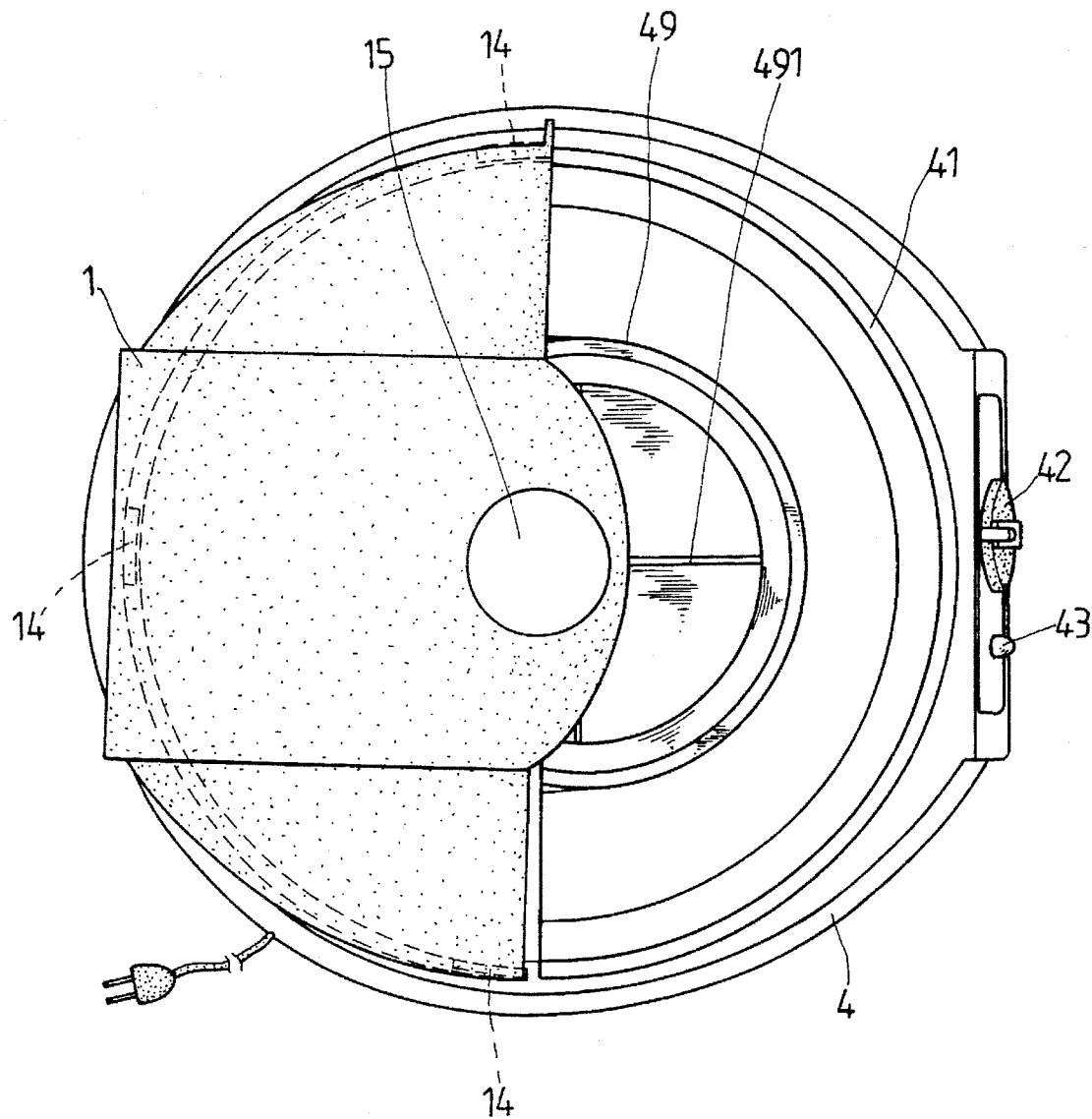
FIG. 7 is a top view showing the open condition of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 1, 2, 3, 4 and 5 thereof, the electric oven according to the present invention mainly comprises a base 4, a door 1, an outer housing 2, a reflector 3, a cover 22, an axle member 23, two heating rods 33, a motor 45, a bottom plate 44, an annular member 48, and a tray 49.

The base 4 is provided on the top with a groove 41 on which is slidably mounted the door 1. The bottom plate 44 is engaged with the bottom of the base 4, on the center of which is mounted a motor 45 having an output shaft 452 extending upwardly out of the top of the base 4. The upper end of the output shaft 452 has a pin 451 with its both ends protruding out thereof. At one side of the base 4 there are mounted an indicator light 43 and a timer 42.

The outer housing 2 is a semi-cylindrical member fixedly arranged on the base 4 and surrounded by the groove 41 of the base 4. On the outer housing 2 is fitted a cover 22 which is provided with a bottom 21. Both the upper cover 22 and the outer housing 2 are formed with a plurality of perforations 221 for dissipating heat.

The two heating rods 33 are provided with threads at both ends and fixedly mounted between the top of the base 4 and the cover 22 by nuts 211.

The annular member 48 having a plurality of rollers 481 at the circumference is rotatably installed on the top of the base 4.

The tray 49 having a tubular portion 490 at the center is arranged on the annular member 48. On the tray 49 is mounted a frame 491 for supporting a hen or the like. A plug 46 is fixedly fitted into the tubular portion 490 of the tray 49 and has slots 461 adapted to engage the pin 451 of the output shaft 452 so that the tray 49 can be driven by the motor 45.

A temperature sensor 31 is mounted on the reflector 3 by a bracket 32 and located between the reflector and the outer housing 2.

The door 1 is pivotally connected with the outer housing 2 by an axle member 23 and has a plurality of engaging portions 14 at the bottom engaged with the groove 41 of the base 4. Further, the door 1 has a hole 12 on the top and a handle 13 at both sides. The axle member 23 is fixedly mounted on bottom side of the cover 22 by screws 225 (see FIGS. 6, 7, 9 and 10). The axle member 23 is formed with an opening 230 the inner side of which has a pair of elongated projections 234 with a stop 235 at one end. The cap 15 having a pair of elongated portions 151 is connected with the axle member 23 through the hole 12 of the door 1 and the cover 22, with its elongated portions 151 engaged with the elongated projections 234 of the axle member 23. The door 1 has an opening 11 on which is mounted a frame 111. Between the frame 111 and the opening 11 is fitted a piece of heat-resistant glass 112.

Figure 8:
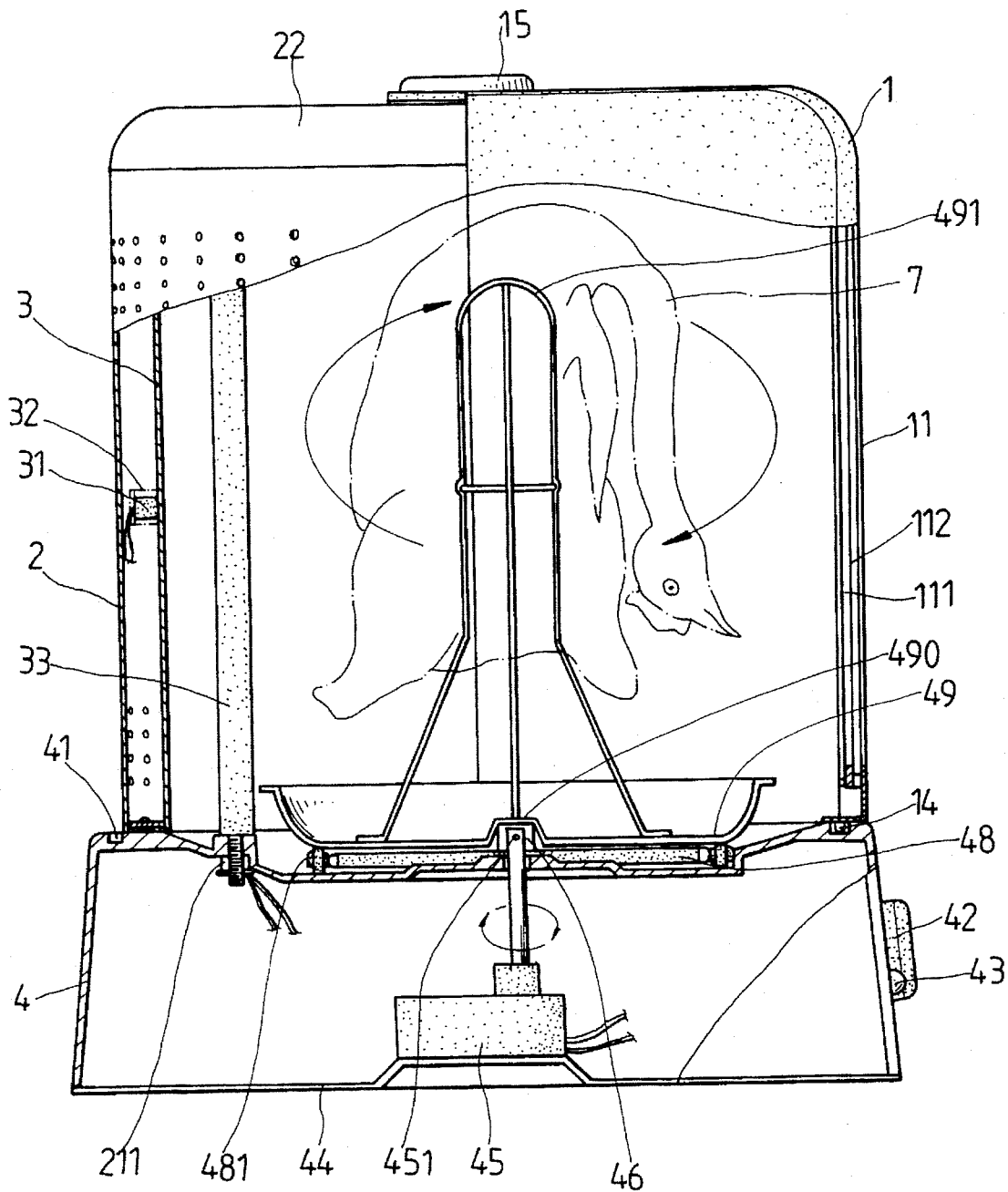
FIG. 8 is a working view of the present invention.
Figure 9:
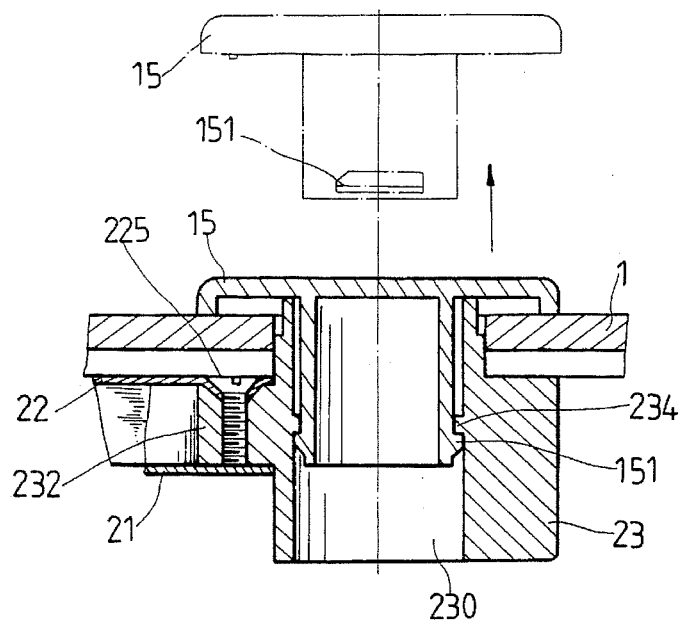
FIG. 9 is a longitudinal sectional view showing the connection between the cap and the axle member.
Figure 10:
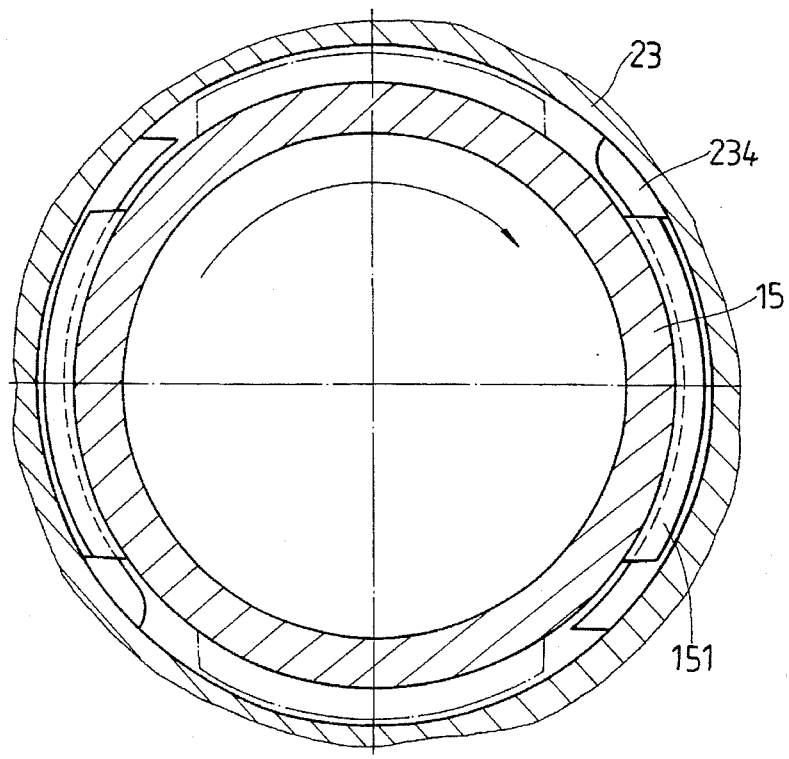
FIG. 10 is a cross sectional view showing the connection between the cap and the axle member.
Figure 11:
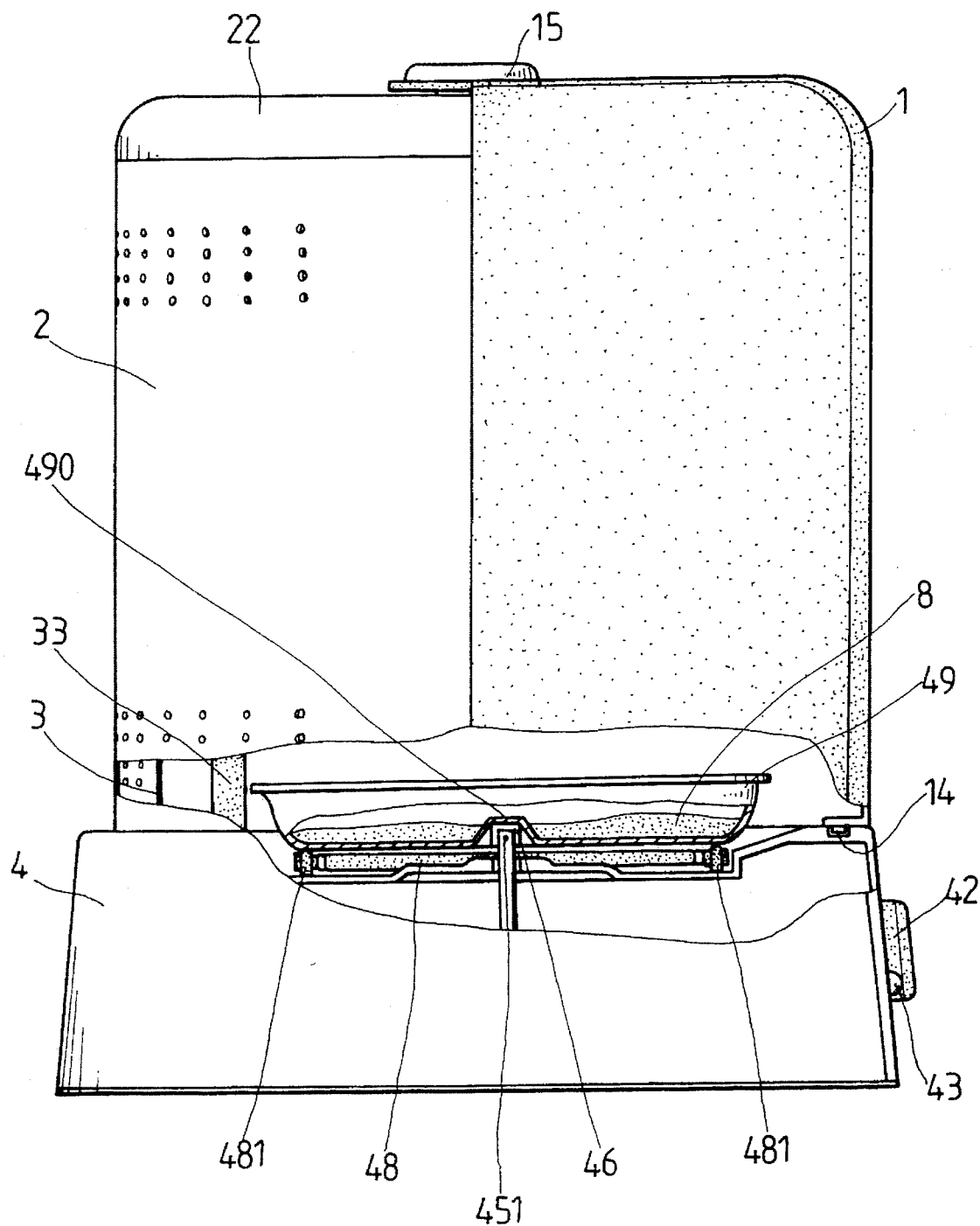
FIG. 11 shows the way to use the present invention to bake a pizza.

FIG. 8 is a working view of the present invention. As illustrated, a hen 7 is supported on the frame 491 and rotated by the tray 49. In addition, the present invention can be also used to bake a pizza (see FIG. 11).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes-all the means constituting technical equivalents of the means described as well as their combinations.

I claim:

1. An electric oven comprising:

a base formed with a groove surrounding a circumference of a top thereof;

a motor arranged within said base and having output shaft upwardly extending out of said base, said output shaft having an upper end provided with a pin horizontally extending through said upper end;

an annular member having a plurality of rollers at a circumference thereof and disposed on the top of said base;

a tray disposed on said annular member and having a tubular portion at a center thereof, said tray being provided with a supporting frame thereon;

a plug having slots adapted to engage two ends of said pin and fixedly engaged with the tubular portion of said tray;

an outer housing fixedly mounted on the top of said base and surrounded by the groove of said base, said outer housing being provided with a plurality of perforations;

a cover engaged with an upper end of said outer housing;

a door rotatably connected with the groove of said base and having a handle at both vertical sides thereof, said door being pivotally connected with said outer housing and provided with a piece of heat-resistant glass, and said door being formed in the shape of an approximately right circular semi-cylindrical shell having one end open and one end closed, the closed end forming a top horizontal surface, so as to completely cover that portion of the oven chamber and outer housing over which it is positioned; and a plurality of heating rods fixedly mounted between said base and said cover.

* * * * *